United States Patent [19]

Busse et al.

[11] Patent Number: 4,486,306
[45] Date of Patent: Dec. 4, 1984

[54] FILTER PRESS WITH FILTER PLATES MUTUALLY LOCKED AND INDIVIDUALLY CONSECUTIVELY SLIDABLE AFTER RELEASE OF LOCKING MEANS

[75] Inventors: Oswald Busse; Hugo Klesper, both of Aarbergen, Fed. Rep. of Germany

[73] Assignee: Passavant-Werke AG & Co. KG, Fed. Rep. of Germany

[21] Appl. No.: 465,421

[22] Filed: Apr. 4, 1983

[30] Foreign Application Priority Data

Feb. 10, 1982 [DE] Fed. Rep. of Germany ....... 3204608

[51] Int. Cl.³ .............................................. B01D 25/12
[52] U.S. Cl. .................................................... 210/230
[58] Field of Search ....................... 210/230, 237, 236; 100/198

[56] References Cited

U.S. PATENT DOCUMENTS

| | | | |
|---|---|---|---|
| 3,547,269 | 12/1970 | Kurita | 210/230 |
| 3,915,863 | 10/1975 | Busse et al. | 210/230 |
| 4,184,960 | 1/1980 | Schotten | 210/230 |

*Primary Examiner*—Thomas Wyse
*Attorney, Agent, or Firm*—Woodford R. Thompson, Jr.

[57] ABSTRACT

A filter press with filter plates slidable individually by a transport element has on each filter plate a locking hook which cooperates for locking with a locking bolt of the adjacent filter plate. A pivotable blocking element, which in the blocked position, positively blocks the locking hook locking this filter plate against unlocking and is connected to an actuating member which projects into the path of the transport element so that immediately before the latter takes along the relevant filter plate it engages the actuating member and thus pivots the blocking element into a release position so that the filter plate is separable after release of the locking hook. Each respective filter plate to be slid thus remains positively locked to the as yet unopened plate stack until immediately before it is taken along by the transport element and cannot become separated from the stack accidentally. The blocking element is preferably in the form of an arm of a double-armed lever and is swingable downwardly by its own weight. The other arm of the double arm lever is an actuating member which precedes a driver for the filter plate to be engaged by the transport element.

8 Claims, 4 Drawing Figures

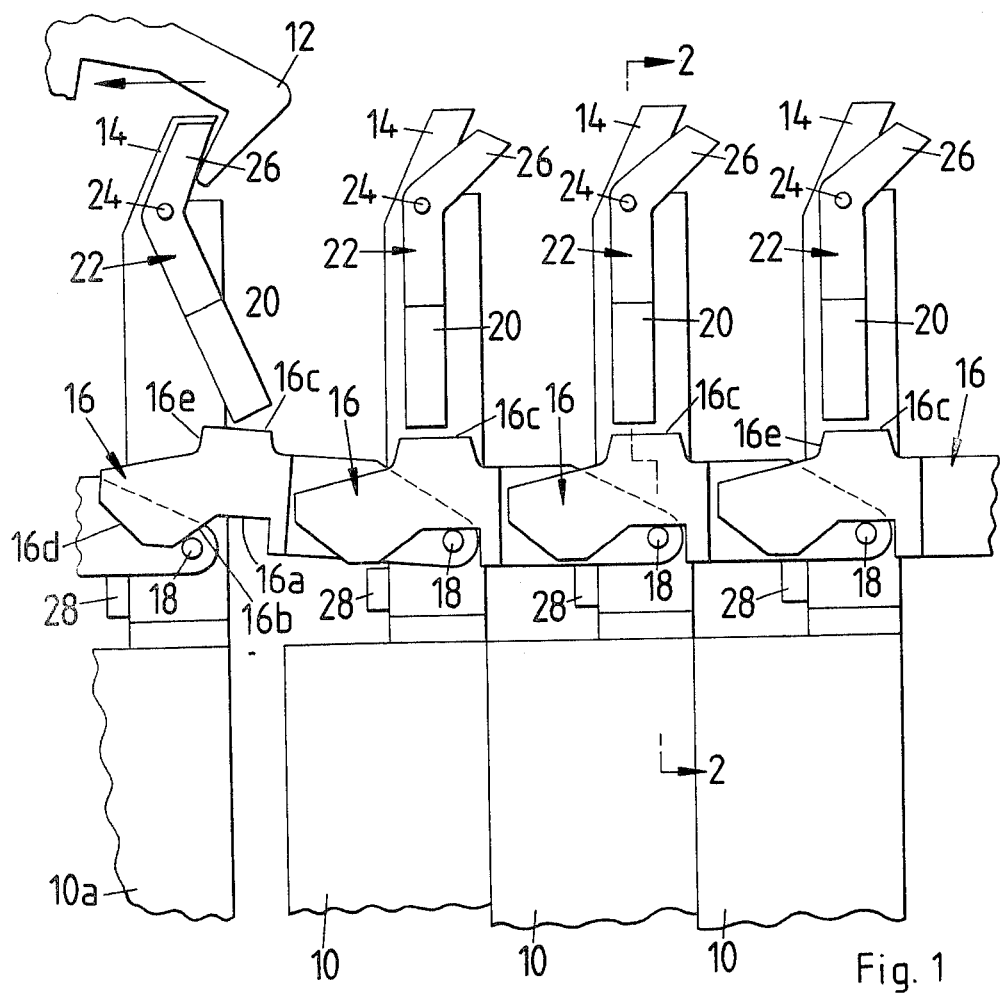
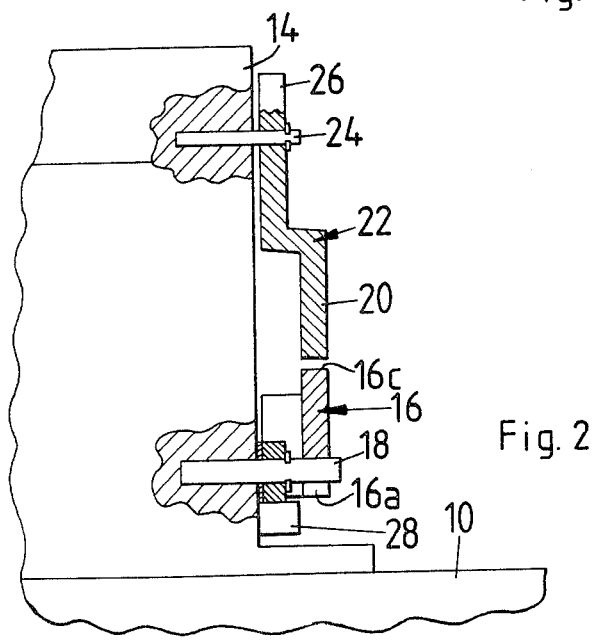

FILTER PRESS WITH FILTER PLATES MUTUALLY LOCKED AND INDIVIDUALLY CONSECUTIVELY SLIDABLE AFTER RELEASE OF LOCKING MEANS

BACKGROUND OF THE INVENTION

This invention relates to a filter press of the type having filter plates mutually locked to each other and individually and consecutively slidable after release of the locking means therefor so that upon closing the filter press each filter plate is locked to the filter plate following it by a locking hook engaging behind a locking bolt and a blocking element positively blocks the unlocking movement of each filter plate until the filter press is opened whereupon the filter plate is then separable from the following filter plate by means of a transport element moving along the filter plate only after the locking hook is released by the blocking element.

A filter press of this type is disclosed in German Offenlegungsschrift No. 25 04 602. In this prior art filter press, the blocking element which assures the locking between two adjacent filter plates is mounted on a third filter plate preceding them in the opening sequence. When this filter plate carrying the blocking element is removed by the transport element during the opening of the plate, the locking means between the two following filter plates is therefore released, so that at the next stroke of the transport element the forwardmost of these two filter plates can be engaged by the transport element and moved along. However, this means that after the separation of a filter plate carrying the blocking element, the two next filter plates are no longer locked positively together during the interval of time until the next stroke of the transport element. That is, at most, the next two filter plates are frictionally locked to each other if the lock means consists of a spring-loaded lock. It has been discovered that this frictional anchorage is not sufficient in many cases, particularly in the case of strongly expanding filter cakes, such as cakes formed from carbon sludges wherein the foremost filter plate of such next two filter plates can separate accidentally from the as yet unopened stack of plates and enter an intermediate position. Accordingly, during the next stroke of the transport element, this filter plate now following is taken along by the transport element, and can strike the filter plate which had previously moved into the intermediate position, which may lead to service breakdowns and damage.

Similar problems may also occur with a filter press as shown in U.S. Pat. No. 3,563,386, in which, at the separation of a filter plate, the locking between the two next filter plates is simultaneously totally released. When this takes place, the foremost plate of the as yet unopened stack of plates has no anchorage at all to the stack of plates during the time it waits for the return of the transport element, and can very easily become detached from the stack.

SUMMARY OF THE INVENTION

It is a principal object of this invention to provide a filter press of the above mentioned type having simple structural elements, so that the positive anchorage of a filter plate to the plate stack is maintained until immediately before it is engaged and moved along by the transport element.

This object is achieved according to our invention in that each blocking element is mounted on its associated filter plate for pivotal movement between a blocking position assuring the locking of that filter plate to the next filter plate and a release position and is connected to an actuating part which projects into the path of movement of the transport element so that immediately before engaging and moving that filter plate the transport element engages the actuating part and through the latter pivots the blocking element into the release position.

The above advantage is achieved by this means due to the fact that upon separation of a filter plate the locking between the two next filter plates is maintained whereby the next filter plate cannot roll away, or be pushed away by the expanding filter cake, from the plate stack during the transport time of the preceding filter plate and the return time of the transport element. Only when the transport element is about to move along the now foremost filter plate does this transport element initially actuate the pivoting of the blocking element and hence the release of the locking of the filter plate which is to be engaged at that moment.

DESCRIPTION OF THE DRAWINGS

Embodiments of our invention are illustrated in the accompanying drawings, forming a part of this application, in which:

FIG. 1 is a side elevational view showing schematically the upper portions of a plurality of filter plates during or before opening;

FIG. 2 is a fragmental view, partly in section and taken generally along the line 2—2 of FIG. 1;

DETAILED DESCRIPTION

Figure 3:
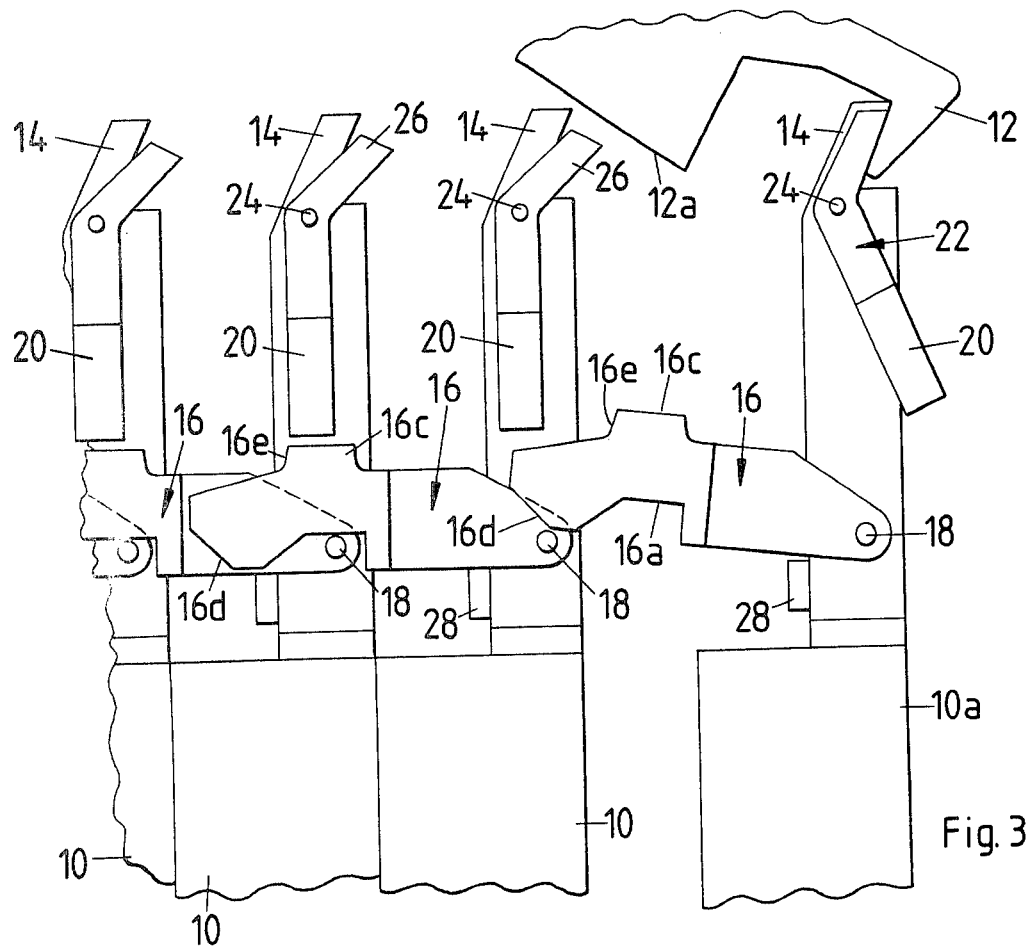
FIG. 3 is a view similar to FIG. 1 showing some filter plates during or after the riding up onto the plate stack which has already been slid.

Referring now to the drawings, the filter press has a large number of filter plates 10, which are suspended for sliding movement in a conventional manner, not shown, from guideways extending in the longitudinal direction of the filter press. During the filtration operation the filter plates, indicated at 10, are in the closed position and are pressed towards each other in mutual contact with no gaps therebetween. After each filtration charge the filter press is opened, and the filter plates 10 are slid individually so that the filter cake therebetween can drop out or be removed. A driven transport element 12, which is provided for sliding the filter plates 10, cooperates with drivers 14 carried by the filter plates. The transport element 12 has a deflector surface 12a, which makes it impossible for it to drop in between the drivers of the filter plates 10 located in the closed stack. That is, the transport element 12 can only drop in behind the driver of each foremost filter plate 10a, respectively, of the stack.

A locking hook 16 is mounted pivotally on each filter plate 10 by a locking bolt 18 and extends towards the preceding filter plate in the direction of opening. Also, each locking hook 16 extends over and engages the locking bolt 18 of its preceding filter plate, as shown. The locking bolt 18 may be an elongated bearing bolt for the locking hook 16 mounted on the same filter plate with each locking hook 16 being of a cranked or off-set construction to permit it to extend laterally over and engage the locking bolt 18 of the preceding filter plate as shown in FIG. 2.

Each locking hook 16 is provided with a locking recess 16a which cooperates with the locking bolt 18, and has a front oblique surface 16b. The length of each recess 16a is such that the locking bolt 18 has sufficient play in the recess 16a to permit slight variations in mutual distances between the filter plates for the "breathing" of the filter plates.

Each locking hook 16 has an upwardly oriented cam surface 16c in position to cooperate with a blocking element 20 which is shown as being one arm of a double-armed lever 22. The lever 22 is mounted on a bolt 24 and extends laterally beside the driver 14 of its filter plate 10. The other arm 26 of the lever 22 extends upwardly at an angle to the arm defining the blocking element 20 and projects in front of the driver 14 into the path of the transport element 12. In the normal blocking position of the arm defining the blocking element 20, the lever 22 hangs substantially vertically downwardly, which may be achieved by appropriate weight distribution. The lower surface of each blocking element 20 is positioned a short distance above the cam surface 16c of its associated locking hook 16, so that the latter is blocked against pivoting upwardly to its unlocked position.

When the transport element 12 drops into engagement with the driver 14 of each respective foremost plate 10a of the plate stack, it first engages the arm 26 of the lever 22 and thereby pivots the blocking element 20 into the release position. Immediately thereafter the transport element 12 engages the driver 14 and exerts a sliding force to the foremost filter plate 10a, whereby its locking bolt 18 engages the oblique surface 16b and thus pivots the associated locking hook 16 upwardly, since the locking hook 16 is no longer blocked by the blocking element 20, which now is in the release position. The foremost plate 10a can thus be drawn away from the plate stack by the transport element 12. It will thus be seen that the foremost plate 10a is locked positively to the plate stack until immediately prior to being engaged by the transport element 12.

FIG. 3 shows the arrival of the filter plate 10a which has just been transported by the transport element 12 onto the stack of the filter plates 10 already slid and relocked previously. The front end of each locking hook 16 is provided with an upwardly and forwardly extending under surface which defines a front oblique ramp 16d, by which it can ride up onto the locking bolt 18 of the previously slid filter plate 10 and can drop in behind the latter. The necessary pivotal movement of the locking hook 16 for this purpose is not prevented since its cam surface 16c has not yet moved to the locked position beneath the blocking element 20 of the foremost filter plate of the stack. Upon further movement the locking hook 16, the blocking element 20 of the filter plate 10 is pivoted aside by a stop 16e at the front of its cam surface 16c. When the recess 16a of the locking hook 16 then drops onto the locking bolt 18, the blocking element 20 can again swing back into its blocking position to positively block movement of the locking hook 16. During the above mentioned operations the deflector surface 12a of the transport element 12 has ridden up onto the driver 14 of the previously slid filter plate 10, whereby the transport element 12 releases the driver 14 of the filter plate 10a which has just been taken along. The residual impetus of the released filter plate 10a is sufficient to perform the residual movement necessary for complete contact with the previously slid filter plate 10 and for proper engagement of the locking means.

When all the filter plates have been slid, the filter plate stack is automatically relocked and is then transported back as a unit through the headpiece of the press back into the initial position.

A lower support 28 is associated with each locking hook 16 in position to engage and brace the locking hook during the sliding movement of the filter plate, so that downward movement of the locking hook is limited whereby it does not drop downwardly.

Figure 4:
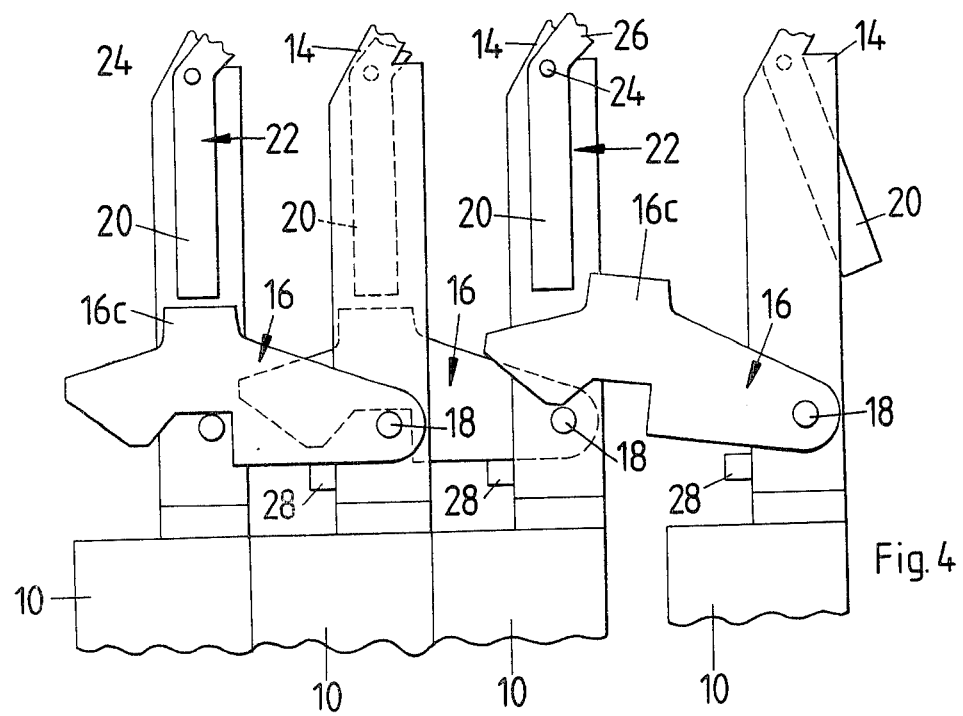
FIG. 4 is a view similar to FIG. 3 showing another embodiment of the invention.

With thin plates, it is possible that the space on one side may not be sufficient to accommodate the locking hooks and associated parts. In this case it is advantageous to arrange the locks alternately on one side and the other side of the drivers 14, as shown in FIG. 4. In this case the cranking or off-setting of the locking hooks 16 and the blocking elements 20 shown in FIGS. 1 and 2 is unnecessary. The bearing bolts for the locking hooks 16 shown in FIG. 4 penetrate the entire driver 14 and form the locking bolt 18 with the other end thereof projecting from the other side of the driver.

The invention is not limited to the particulars of the embodiments illustrated. That is, it is possible to construct and arrange the blocking elements 20 so that they return into the blocking position by means other than by gravity, such as by spring power. While we show the actuating arm 26 cooperating with the transport element 12 as being connected integrally to the blocking element 20, it will be apparent that it may be a separate member which is operatively connected to the blocking element 20. If a spring is associated with the blocking element 20 or with its actuating arm 26 for returning the same to the blocking position, then this spring may simultaneously serve to alleviate the shock when the transport element 12 strikes against the driver 14 of each filter plate.

The locking hooks 16, which in the embodiments illustrated rest by their deadweight upon the associated locking bolts 18, may instead or additionally be tensioned towards the locking bolts by springs. As a result, a frictional anchorage of the respective plate to be separated still exists even after its associated blocking element 20 has been pivoted and the positive locking thereof has thereby been eliminated. Although this would probably not take effect during normal operation, because the time interval between the unblocking of the locking system and the taking along of the filter plate is extremely short, nevertheless, if one of the blocking elements should fail to swing back into the blocking position, such as due to service breakdown, dirt or the like, the above-mentioned frictional mutual anchorage of the plates would be advantageous.

What we claim is:

1. A filter press having filter plates mutually locked by locking means and individually and consecutively slidable after release of the locking means, wherein when the filter press is closed each filter plate is locked to the filter plate following it by a locking hook engaging a locking bolt and when the filter press is opened is separable from the following filter plate by means of a transport element moving along the filter plate, the improvement comprising:

(a) a blocking element mounted on each filter plate for pivotal movement to a blocking position positively blocking unlocking movement of the locking hook locking its filter plate to said following filter plate and to a release position to release its filter plate for separation from said following filter plate only after said locking hook is released by said blocking element, (b) an actuating member connected to each said blocking element and projecting into the path of movement of said transport element so that immediately before taking along a filter plate said transport element engages the actuating member associated with that filter plate and through said actuating member pivots its blocking element into said release position, and (c) each said locking hook having an oblique under surface in position to engage said locking bolt for separation of said locking hook from its associated locking bolt when said blocking element is in said release position.

2. A filter press as defined in claim 1 in which the blocking element returns automatically into the blocking position after the release of the actuating member by said transport element.

3. A filter press as defined in claim 1 or 2 in which the blocking element comprises one arm of a double-armed lever with the other arm of said double-armed lever forming said actuating member.

4. A filter press as defined in claim 3 in which said one arm of said lever forming the blocking element extends vertically and downwardly in the blocking position with its lower surface spaced a short distance above a cam surface on the locking hook extending over and engaging the associated locking bolt.

5. A filter press as defined in claim 3 in which said lever is mounted for free swinging movement into said blocking position by gravity due to its weight distribution.

6. A filter press as defined in claims 1 or 2 in which said actuating member precedes a driver for the filter plate to be engaged by the transport element with reference to the direction of movement of the transport element while said blocking element is in said blocking position.

7. A filter press as defined in claims 1 or 2 in which the locking bolt engages a locking recess in its associated locking hook with sufficient play to permit slight variations in mutual distances between the filter plates.

8. A filter press as defined in claims 1 or 2 in which each locking hook extends from its associated filter plate towards the preceding filter plate in opening sequence and is provided with an oblique ramp in position to ride onto the locking bolt of said preceding filter plate and is provided with a stop in position to push aside said blocking element of said preceding filter plate occupying said blocking position.

* * * * *